United States Patent
Muñoz García et al.

(10) Patent No.: US 12,528,089 B2
(45) Date of Patent: Jan. 20, 2026

(54) METHOD FOR THE REGENERATION OF THE MAGNETIC MATERIAL USED FOR THE MAGNETIC REMOVAL OF MICROPLASTICS FROM AQUEOUS MATRICES

(71) Applicants: Captoplastic, S.L., Madrid (ES); Universidad Autónoma De Madrid, Madrid (ES)

(72) Inventors: Macarena Muñoz García, Madrid (ES); Neus López Aragó, Madrid (ES); Raquel Parra Sánchez, Madrid (ES); Zahara Martínez De Pedro, Madrid (ES); José Antonio Casas De Pedro, Madrid (ES)

(73) Assignees: Captoplastic, S.L., Madrid (ES); Universidad Autónoma de Madrid, Madrid (ES)

( * ) Notice: Subject to any disclaimer, the term of this patent is extended or adjusted under 35 U.S.C. 154(b) by 0 days.

(21) Appl. No.: 18/833,092

(22) PCT Filed: Jan. 26, 2023

(86) PCT No.: PCT/EP2023/051898
§ 371 (c)(1),
(2) Date: Jul. 25, 2024

(87) PCT Pub. No.: WO2023/144253
PCT Pub. Date: Aug. 3, 2023

(65) Prior Publication Data
US 2025/0161955 A1    May 22, 2025

(30) Foreign Application Priority Data
Jan. 27, 2022    (EP) .................... 22382062

(51) Int. Cl.
B03C 1/015    (2006.01)
B03C 1/02    (2006.01)
C01G 49/08    (2006.01)

(52) U.S. Cl.
CPC ............... B03C 1/015 (2013.01); B03C 1/02 (2013.01); C01G 49/08 (2013.01);
(Continued)

(58) Field of Classification Search
CPC ....... B03C 1/015; B03C 1/02; B03C 2201/18; C01G 49/08; C01P 2004/64; C01P 2006/42
See application file for complete search history.

(56) References Cited

U.S. PATENT DOCUMENTS

| | | | | |
|---|---|---|---|---|
| 4,735,725 A | * | 4/1988 | Reischl | B03C 1/01 |
| | | | | 210/695 |
| 2014/0186268 A1 | * | 7/2014 | Vasiljeva | H01F 1/0054 |
| | | | | 424/9.6 |
| 2022/0226834 A1 | * | 7/2022 | Muñoz García | B03C 1/288 |

FOREIGN PATENT DOCUMENTS

| WO | WO 2020/240069 | 12/2020 |
|---|---|---|
| WO | WO 2021/261078 | 12/2021 |

OTHER PUBLICATIONS

Bergmann et al. "Marine Anthropogenic Litter", Alfred-Wegeneer-Institut Helmholtz-Zentrum für Polar- und Meeresforschung, Bremerhaven, Germany, University of Gothenburg, Sweden, p. I-XVII, 17-456, 2015.
(Continued)

*Primary Examiner* — Michael McCullough
*Assistant Examiner* — Kalyanavenkateshware Kumar

(57) ABSTRACT

The present invention relates to a process for breaking up microplastic/magnetic material aggregates. The process allows both regenerating the magnetic material and obtaining magnetic material-free microplastics. The present inven-
(Continued)

tion consists fundamentally of breaking up magnetic material/microplastic aggregates by means of treatment thereof with a concentrated aqueous saline solution, and subsequently separating both types of solids by density and/or by applying a magnetic field.

16 Claims, 2 Drawing Sheets

(52) U.S. Cl.
CPC ...... *B03C 2201/18* (2013.01); *C01P 2004/62* (2013.01); *C01P 2006/42* (2013.01)

(56) References Cited

OTHER PUBLICATIONS

Cole et al. "Isolation of Microplastics in Biota-Rich Seawater Samples and Marine Organisms", Scientific Reports, 4: 4528-1-4528-8, Mar. 31, 2014.

Cox et al. "Human Consumption of Microplastics", Environmental Science & Technology, 53(12): 7068-7074, Jun. 5, 2019.

Grbic et al. "Magnetic Extraction of Microplastics From Environmental Samples", Environmental Science & Technology, 6(2): 68-72, Published Online Jan. 25, 2019.

McArthur et al. "The New Plastics Economy: Rethinking the Future of Plastics", World Economic Forum, 36 P., Jan. 2016.

Plastics Europe "Plastics—The Facts 2020: An Analysis of European Plastics Production, Demand and Waste Data", Plastics Europe, Association of Plastics Manufacturer, 64 P., 2020.

Wieczorek et al. "Microplastic Ingestion by Gelatinous Zooplankton May Lower Efficiency of the Biological Pump", Environmental Science & Technology, 53(9): 5387-5395, Published Online Apr. 1, 2019.

Wright et al. "Plastic and Human Health: A Micro Issue?", Environmental Science & Technology, 51(12): 6634-6647, Published Online May 22, 2017.

International Preliminary Report on Patentability Dated Jan. 26, 2024 From the International Preliminary Examining Authority Re. Application No. PCT/EP2023/051898. (16 Pages).

International Search Report and the Written Opinion Dated Feb. 27, 2023 From the International Searching Authority Re. Application No. PCT/EP2023/051898. (11 Pages).

Rhein et al. "Agglomerate Processing and Recycling Options in Magnetic Seeded Filtration", Chemical Engineering Science, XP086556090, 238: 116577-1-116577-11 , Available Online Mar. 11, 2021.

Rhein et al. "Magnetic Seeded Filtration for the Separation of Fine Polymer Particles From Dilute Suspensions: Microplastics", Chemical Engineering Science, XP085766784, 207: 1278-1287, Available Online Jul. 24, 2019.

\* cited by examiner

METHOD FOR THE REGENERATION OF THE MAGNETIC MATERIAL USED FOR THE MAGNETIC REMOVAL OF MICROPLASTICS FROM AQUEOUS MATRICES

RELATED APPLICATIONS

This application is a National Phase of PCT Patent Application No. PCT/EP2023/051898 having International filing date of Jan. 26, 2023, which claims the benefit of priority of Europe patent application Ser. No. 22/382,062.2 filed on Jan. 27, 2022. The contents of the above applications are all incorporated by reference as if fully set forth herein in their entirety.

FIELD AND BACKGROUND OF THE INVENTION

The present invention relates to a process for the regeneration of the magnetic material used in the magnetic separation of microplastics from aqueous matrices. The process also allows obtaining magnetic material-free microplastics. The present invention consists fundamentally of breaking up magnetic material/microplastic aggregates by means of treatment thereof with a concentrated aqueous saline solution, and subsequently separating both types of solids by density and/or by applying a magnetic field.

The excellent properties of plastics, among which the easy molding, high mechanical and chemical resistance, and the low cost thereof stand out, have led to them being widely used both by industry and by society as a whole. Since the development of the first synthetic polymers in the mid 20th century, the production of these synthetic polymers has not stopped growing. In 2019, the global production of plastics reached 370 million tons (PlasticsEurope, 2020), and the manufacture of plastics is expected to double in the next twenty years (MacArthur, D. E. et al., The New Plastics Economy: Rethinking the Future of Plastics. World Economic Forum. (2016)). Although plastics are undeniably useful, the generation of plastic waste and the inadequate management thereof represent an important environmental problem.

The removal of plastic when said plastic is large-sized, is not problematic. However, plastic breaks up with use, generating small-sized pieces of plastic which are harder to remove, particularly when said pieces have a millimetric diameter. Microplastics, defined as plastic particles having a size less than 5 mm (Bergmann, M. et al., Marine Anthropogenic Litter (2015) Springer), are traces of plastic having a widespread presence in the environment. Microplastics have been found in practically all the ecosystems on Earth, including inland and marine water, sediments, air, and soils (Grbic, J. et al., Environmental Science and Technology Letters 6 (2019) 68-72). Accordingly, they are also present in organisms (Cole, M. et al., Nature Scientific Reports 4:4528 (2014) 1-8; Wieczorek, A. M. et al., Environmental Science and Technology 53 (2019) 5387-5396), fundamentally in aquatic organisms, so there is considerable concern for the potential damages that their presence may have both in humans and in fauna (Wright, S. L. et al., Environmental Science and Technology 51 (2017) 6634-6647; Cox, K. D. et al., Environmental Science and Technology 53 (2019) 7068-7074).

According to recent studies (ES 2 796 998 A1 and WO 2020/240069 A1 and Grbic, J. et al., Environmental Science and Technology Letters, 6 (2019) 68-72), the separation of microplastics from water is highly effective by means of interaction thereof with magnetic particles and the subsequent application of a magnetic field regardless of the nature and size of the microplastics. This method has significant advantages with respect to conventional filtration methods, although it entails a relatively high magnetic material consumption and inevitably generates waste (microplastic/magnetic particle aggregates). On the other hand, in the case of using magnetic separation as a method for analyzing the microplastics present in aqueous matrices, the generation of microplastic/magnetic material aggregates leads to an increase in the density of the microplastics, which would limit subsequent density separation of said microplastics from the rest of the solids present in the water (and which would also have interacted with the magnetic material). Likewise, subsequent characterization of the microplastics would also be hindered since they would form part of the aggregates, and the magnetic material may interfere in the analyses. Up until now, no process could be found in the literature which allows breaking up microplastic/magnetic material aggregates and separating both types of solids. This may be why the magnetic separation of microplastics from water for quantification and characterization has not been investigated until now. This is also an important limitation in the large-scale use of this technology in water treatment.

In view of the background, the development of a process which allows breaking up the microplastic/magnetic material aggregates formed and separating both types of solids regardless of their composition and size, in an efficient, fast, environmentally friendly, and cost-effective manner would represent a crucial finding in this field.

SUMMARY OF THE INVENTION

The inventors have surprisingly discovered that microplastic/magnetic iron material aggregates can be broken up and both types of solids can thus be separated. This separation is useful, for example, to facilitate subsequent characterization of the microplastics. It is also useful to achieve the regeneration of the magnetic iron material so that it can be reused in the water treatment system. Separation of magnetic aggregate-forming constituents is a subject of considerable interest which has not been reported in the literature up until now. The inventors have unexpectedly discovered that the introduction of these microplastic/magnetic iron material aggregates in a highly concentrated saline solution allows breaking up the interaction binding them together, and therefore completely separating the magnetic iron material from the microplastics.

As shown in the examples, microplastic/magnetic iron material aggregates were broken up in a very efficient manner, achieving recovery yields exceeding 99.0% regardless of the nature and size of the plastic. Furthermore, recovered microplastics were completely free of the magnetic material. The process of the present invention is particularly advantageous because it also allows breaking up non-plastic organic solid particles/magnetic iron material aggregates, achieving recovery yields for the magnetic material exceeding 99.0% regardless of the nature and size of the non-plastic organic solid particles. Characterization of the recovered magnetic material allowed confirming that the solid did not sustain any significant change in its composition, size, and crystallinity. In fact, the recovered magnetic iron material was used again in the system without any loss of efficacy being observed. Another additional advantage of the process of the present invention is that all the reagents used are environmentally friendly. Likewise, it is important to point out the simplicity of the required equipment and the low cost of the materials and reagents used. Lastly, the methods have shown high reproducibility of the obtained results.

Thus, in a first aspect, the invention relates to a process for breaking up magnetic iron material/organic particle aggregates, preferably microplastic/magnetic iron material particle aggregates, the process comprising:
a) providing the magnetic iron material/organic particle aggregates, preferably microplastic/magnetic iron material particle aggregates,
b) introducing the aggregates of step a) in a aqueous saline solution for breaking up the aggregates, wherein the salt of the aqueous saline solution is selected from the group consisting of $NaH_2PO_4$, $Na_2HPO_4$, $Na_3PO_4$, NaCl, NaI, $ZnBr_2$, $ZnCl_2$, and mixtures thereof, and wherein the salt concentration of the aqueous saline solution is in the range of 10 g/L to 1000 g/L, and
c) optionally separating the magnetic iron material particles from the organic particles by applying a magnetic field and/or by density separation.

In a second aspect, the invention relates to a process for breaking up magnetic iron material/organic particle aggregates according to the first aspect further comprising the characterization of the organic particles and/or the recovery of the magnetic iron material.

DESCRIPTION OF SPECIFIC EMBODIMENTS OF THE INVENTION

Figure 1:
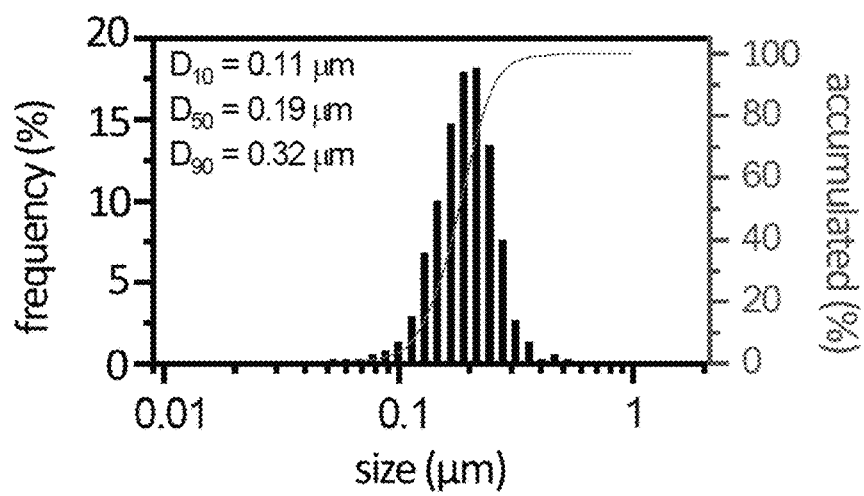
FIG. 1: Particle size distribution of the magnetic iron mineral (magnetite) used in the examples.

The first aspect of the invention relates to a process for breaking up magnetic iron material/organic particle aggregates, preferably microplastic/magnetic iron material particle aggregates, the process comprising:
a) providing the magnetic iron material/organic particle aggregates, preferably microplastic/magnetic iron material particle aggregates,
b) introducing the aggregates of step a) in a aqueous saline solution for breaking up the aggregates, wherein the salt of the aqueous saline solution is selected from the group consisting of $NaH_2PO_4$, $Na_2HPO_4$, $Na_3PO_4$, NaCl, NaI, $ZnBr_2$, $ZnCl_2$, and mixtures thereof, and wherein the salt concentration of the aqueous saline solution is in the range of 10 g/L to 1000 g/L, and
c) optionally separating the magnetic iron material particles from the organic particles by applying a magnetic field and/or by density separation.

Step a) is providing the magnetic iron material/organic particle aggregates, preferably microplastic/magnetic iron material particle aggregates.

In a preferred embodiment, microplastic/magnetic iron material particle aggregates and magnetic iron material/non-plastic organic particle aggregates are provided in step a).

In another preferred embodiment, microplastic/magnetic iron material particle aggregates are provided in step a).

The magnetic iron material/organic particle aggregates, preferably microplastic/magnetic iron material particle aggregates, may have been obtained, for example, following the processes described in documents ES 2 796 998 A1 and WO 2020/240069 A1.

In the context of the present invention, the term "microplastic" or "microplastics" refers to a plastic material having an average diameter of less than 5 mm, preferably with an average diameter comprised in the range of 0.1 µm to 5 mm, more preferably in the range of 0.1 µm to 1 mm, even more preferably in the range of 0.1 µm to 500 µm, even more preferably from 100 µm to 500 µm, even more preferably from 100 µm to 250 µm. The size of the microplastics can be determined by means of scanning electron microscopy, for example, using the conditions described in the examples. The length and width of the microplastics are measured, and they are assigned the size of the largest dimension (length). The average diameter is defined as the average length of the microplastic particles (summation of lengths of the analyzed particles among the number of particles analyzed).

The microplastics can be formed by any plastic material, preferably synthetic organic polymers, such as polyethylene terephthalates (PET), polyethylenes (PE) including high-density polyethylenes (HDPE) and low-density polyethylenes (LDPE), polyvinyl chlorides (PVC), polypropylenes (PP), polystyrenes (PS), polycarbonates (PC), polyurethanes (PU), and combinations thereof.

"Polyethylene terephthalate" or "PET" is a polymer that can be obtained by means of a reaction of polycondensation between terephthalic acid and ethylene glycol. Polyethylene terephthalate has the following structure.

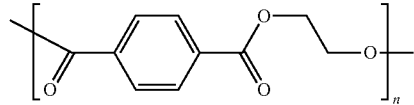

"Polyethylene" or "PE" refers to a polymer that can be obtained by the polymerization of ethylene. Polyethylene has the following structure.

"High-density polyethylene" or "HDPE" refers to a polyethylene the density of which is comprised in the range of 0.930 to 0.970 g/mL. "Low-density polyethylene" or "LDPE" refers to a polyethylene the density of which is comprised in the range of 0.917 to 0.930 g/mL.

"Polyvinyl chloride" or "PVC" refers to a polymer that can be obtained by the polymerization of vinyl chloride. Polyvinyl chloride has the following structure.

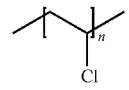

"Polypropylene" or "PP" refers to a polymer that can be obtained by the polymerization of propylene. Polypropylene has the following structure.

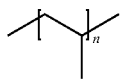

"Polystyrene" or "PS" refers to a polymer that can be obtained by the polymerization of styrene. Polystyrene has the following structure.

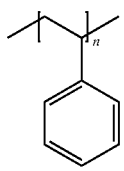

"Polycarbonate" or "PC" refers to a polymer comprising functional groups attached by carbonate groups (—O—C=O)—O—), such as for example diallyl diethylene glycol polycarbonate, or the most widely known, bisphenol A polycarbonate, the structure of which is shown below.

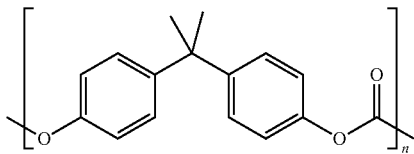

"Polyurethane" or "PU" refers to a polymer that can be obtained by the condensation of polyols, among which ethylene glycol and propylene glycol stand out, and polyisocyanates, among which methylene diphenyl diisocyanate (MDI) and toluene diisocyanate (TDI) stand out, giving rise to urethane groups (—NH—(C=O)—O—) in the structure of the polymer. There is a wide range of polyurethanes due to the range of polyisocyanates and polyols that can be used to form them.

In a preferred embodiment, the microplastic is selected from the group consisting of polyethylene terephthalate (PET), polyethylene (PE) including high-density polyethylene (HDPE) and low-density polyethylene (LDPE), polyvinyl chloride (PVC), polypropylene (PP), polystyrene (PS), polycarbonate (PC), polyurethane (PU), and mixtures thereof; more preferably polystyrene, polypropylene, polyethylene terephthalate, high-density polyethylene, low-density polyethylene, and a mixture thereof; even more preferably polystyrene, polypropylene, polyethylene terephthalate, and a mixture thereof; even more preferably polystyrene, polypropylene, and a mixture thereof; most preferably polystyrene. An advantage of the process of the invention is its universal character because the magnetic iron material/microplastic aggregates are broken up in an efficient manner regardless of the chemical nature of the microplastic.

In a particular embodiment, the microplastics are selected from the group consisting of polystyrene, polypropylene, polyethylene terephthalate, and a mixture thereof with a size in the range of 100 μm to 500 μm, preferably from 100 μm to 250 μm.

The term "magnetic iron material" refers to any natural or synthetic solid substance, comprising at least one iron species and having magnetic properties, i.e., it is attracted by a magnet. In a particular embodiment, the magnetic iron material is inorganic. In a particular embodiment, the magnetic iron material is not coated, i.e., they are bare magnetic material particles. Preferably, the magnetic iron material has a magnetic saturation between 5 and 100 emu/g (between $5 \cdot 10^3$ and $10^5$ A/m), more preferably between 30 and 90 emu/g (between $30 \cdot 10^3$ and $90 \cdot 10^3$ A/m), even more preferably between 65 and 90 emu/g (between $65 \cdot 10^3$ and $90 \cdot 10^3$ A/m), most preferably between 70 and 90 emu/g (between $70 \cdot 10^3$ and $90 \cdot 10^3$ A/m). The magnetic properties of the magnetic iron material can be determined using a magnetometer with a SQUID (superconducting quantum interference device) sensor. The magnetization (M) of the magnetic iron material is measured depending on the external magnetic field applied (H) in the range of −10000 to 10000 Oe (which is equivalent to −797700 to 797700 A/m) at room temperature. The magnetic saturation value of the material is that value of M reached when any subsequent increase in H does not cause an increase in the magnetization of the material. Preferably, the iron material has an iron content of at least 10% by weight with respect to the total weight of the material, preferably at least 20% by weight, more preferably at least 25% by weight, even more preferably at least 30% by weight, even more preferably at least 35% by weight, even more preferably at least 40% by weight, even more preferably at least 45% by weight, even more preferably at least 50% by weight, even more preferably at least 55% by weight, even more preferably at least 60% by weight, even more preferably at least 65% by weight. The percentage of iron can be determined using a total reflection x-ray fluorescence (TXRF) spectrometer using the method described in the examples.

Preferably, the magnetic iron material comprises an iron species selected from the group consisting of Fe(II), Fe(III), metallic Fe, and a mixture thereof. One example would be magnetic iron minerals, such as magnetite (formed by ferrous-diferric oxide $FeO \cdot Fe_2O_3$, sometimes formulated as $Fe_3O_4$), maghemite ($\gamma$-$Fe_2O_3$), ilmenite ($FeTiO_3$) and pyrrhotite ($Fe_{0.8-1}S$), among others. In a preferred embodiment, the magnetic iron material is the mineral magnetite.

The use of magnetic iron minerals, particularly magnetite, is advantageous from the economic and environmental viewpoint because they are materials that are abundant, environmentally-friendly, and readily separated from the aqueous matrices.

The magnetic iron material is in the form of particles. The term "particle" refers to the magnetic iron material being in the form of powder or granules with an average diameter of less than 5 mm, preferably the average diameter of which is comprised between 0.05 μm and 5 mm, more preferably between 0.05 μm and 1 mm, even more preferably between 0.05 μm and 500 μm, even more preferably between 0.05 μm and 100 μm, even more preferably between 0.1 μm and 10 μm, even more preferably between 0.1 μm and 5 μm, even more preferably between 0.1 μm and 1 μm, even more preferably between 0.1 μm and 0.5 μm, most preferably between 0.1 μm and 0.3 μm. Preferably, the particle size distribution must be sufficiently narrow in the established size range. The determination of the magnetic iron material particle size and distribution can be performed by means of scanning electron microscopy, for example, using the conditions described in the examples. The length and width of the microplastics are measured, and they are assigned the size of the largest dimension (length). The average diameter is defined as the average length (summation of lengths of the analyzed particles among the number of analyzed particles), with the length being the largest dimension of each magnetic iron material particle. For the determination of the particle size distribution, it is appropriate to use the statistical values D10, D50, and D90, which intercept 10%, 50%, and 90% by volume of the accumulated particles. In the preferred range, D10 (which indicates that 10% by volume of the particles of the sample have a diameter smaller than this value) is less than or equal to 0.3 µm, D50 (which indicates that 50% by volume of the particles of the sample have a diameter smaller than this value, and it represents the mean grain size) is less than or equal to 0.50 µm, and D90 (which indicates that 90% by volume of the particles of the sample have a diameter smaller than this value) is less than or equal to 0.8 µm. In the most preferred range, D10 (which indicates that 10% by volume of the particles of the sample have a diameter smaller than this value) is less than or equal to 0.15 µm, D50 (which indicates that 50% by volume of the particles of the sample have a diameter smaller than this value, and it represents the mean grain size) is less than or equal to 0.20 µm, and D90 (which indicates that 90% by volume of the particles of the sample have a diameter smaller than this value) is less than or equal to 0.35 µm. The magnetic iron material particles can be obtained by means of grinding the material and later sieving in the size ranges described above. The size of the magnetic iron material particles refers to the average diameter of said particles determined in dry conditions, without considering the agglomeration of the magnetic material particles when suspended in an aqueous matrix.

The terms "microplastic/magnetic iron material particle aggregates" or "microplastic/magnetic iron material aggregates" refer to a cluster of particles formed by the microplastics and the magnetic iron material particles preferably due to the interaction occurring between them. Likewise, the terms "organic particle/magnetic iron material particle aggregates" or "organic/magnetic iron material particle aggregates" refer to a cluster of particles formed by organic particles (non-microplastic) and the magnetic iron material particles due to the interaction occurring between them. Likewise, the terms "non-plastic organic particle/magnetic iron material particle aggregates" or "non-plastic organic/magnetic iron material particle aggregates" refer to a cluster of particles formed by non-plastic organic particles and the magnetic iron material particles due to the interaction occurring between them. This interaction is a physicochemical interaction; no change has been observed in the chemical structure, although there is an effective anchoring between the surface of both substances such that the aggregate remains intact despite the stirring or modification of the properties of the water (temperature, pH).

The expression "non-plastic organic particles" or "non-plastic organic solid particles" refers to particles which can have any shape and the average diameter of which is in the range of 0.1 µm to 1 cm, preferably from 0.1 µm to 5 mm, 0.1 µm to 5 mm, preferably from 0.1 µm a 1 mm, more preferably from 0.1 µm to 500 µm, even more preferably from 100 µm to 500 µm, even more preferably from 100 µm to 250 µm, and which are not made of a plastic material, with the average diameter being the average length (summation of lengths of the analyzed particles among the number of analyzed particles) and the length being the largest dimension of each particle. Examples of plastics are the same as those described for microplastics. Examples of non-plastic (organic) material particles are of a plant origin (leaves, branches, seeds, fruits, etc.), an animal origin (bones, microcrustaceans, larvae, animal remains, etc.), a fungal origin, etc. The size of the particles can be determined the same way as described for microplastics.

The expression "organic particles" includes both "non-plastic organic particles" and the "microplastics" defined above.

In a particular embodiment, the organic particles are selected from the group consisting of microplastics, non-plastic organic particles, and a mixture thereof, preferably microplastics.

Next, step b) is performed by introducing the aggregates of step a) in an aqueous saline solution for breaking up the aggregate, wherein the salt of the aqueous saline solution is selected from the group consisting of $NaH_2PO_4$, $Na_2HPO_4$, $Na_3PO_4$, NaCl, NaI, $ZnBr_2$, $ZnCl_2$, and mixtures thereof, and wherein the salt concentration of the aqueous saline solution is in the range of 10 g/L to 1000 g/Ls.

In a preferred embodiment, the salt of the aqueous saline solution of step b) is selected from the group consisting of $NaH_2PO_4$, $Na_2HPO_4$, $Na_3PO_4$, NaCl, NaI, $ZnCl_2$, and mixtures thereof; more preferably, from the group consisting of $NaH_2PO_4$, $Na_2HPO_4$, $Na_3PO_4$, NaCl, NaI, and mixtures thereof; even more preferably, the salt is $NaH_2PO_4$, NaCl or NaI, still more preferably $NaH_2PO_4$.

Preferably, the concentration of salt/salts of the aqueous saline solution of step b) is selected based on the solubility of the salt/salts used in water. The concentration of the concentrated aqueous saline solution is at least 10 g/L. Preferably, the concentration of the concentrated aqueous saline solution is in the range of 10 g/L to 1000 g/L, preferably from 100 g/L to 1000 g/L, more preferably from 300 g/L to 1000 g/L, even more preferably from 300 g/L to 900 g/L, even more preferably from 500 g/L to 900 g/L, most preferably from 700 g/L to 900 g/L.

In a particular embodiment, the aqueous saline solution is an aqueous solution of a salt selected from the group consisting of $NaH_2PO_4$, $Na_2HPO_4$, $Na_3PO_4$, and mixtures thereof, wherein the salt concentration is of 500 g/L to 900 g/L.

In a particular embodiment, the aqueous saline solution is an aqueous solution of NaCl, wherein the NaCl concentration is of 100 g/L to 360 g/L.

In another particular embodiment, the aqueous saline solution is an aqueous solution of NaI, wherein the NaCl concentration is of 150 g/L to 600 g/L.

In a preferred embodiment, the aqueous saline solution is an aqueous $NaH_2PO_4$ solution in a concentration of 700 g/L to 900 g/L.

In a preferred embodiment, the concentration of aggregates introduced in the aqueous saline solution in step b) is 1 mg/L to 2000 g/L.

In a preferred embodiment, the mixture obtained in step b) is subjected to stirring. Stirring favors the interaction of the microplastic/magnetic iron material aggregates with the concentrated saline solution. Stirring can be performed by means of any conventional method known to one skilled in the art, such as, for example, mechanical, magnetic, or ultrasound-assisted stirring, and more preferably, ultrasound-assisted stirring.

In a preferred embodiment, the time required for breaking up the microplastic/magnetic iron material aggregates using the aqueous saline solution of step b) is in the range of 1 s to 24 h, more preferably from 1 s to 12 h, even more preferably from 1 s to 6 h, even more preferably from 1 s to 1 h, most preferably from 1 min to 30 min.

In a particular embodiment, the process of the invention is performed discontinuously, i.e., in batches.

In another particular embodiment, the process of the invention is performed continuously.

The next step, step c), is optional and is separating the magnetic iron material particles from the organic particles by applying a magnetic field and/or by density separation.

In a preferred embodiment, step c) is performed.

In said step, the mixture obtained in step b) is subjected to separation by density and/or by applying a magnetic field for separating clean microplastics in the supernatant.

In a preferred embodiment, step c) is performed and the magnetic iron material particles are separated from the organic particles in said step c) by density.

In another embodiment, step c) is performed and the magnetic iron material particles are separated from the organic particles in said step c) by applying a magnetic field.

In another embodiment, step c) is performed and the magnetic iron material particles are separated from the organic particles in said step c) by density and by applying a magnetic field.

In a preferred embodiment, the mixture obtained in step b) is left to stand and clean microplastics in the supernatant are then removed by means of the filtration thereof, particularly by means of vacuum filtration.

Preferably, the mixture obtained in step b) is left to stand and a magnetic field is applied at the same time in the lower part of the vessel containing same, and clean microplastics in the supernatant are then removed by means of the filtration thereof, particularly by means of vacuum filtration.

In a particular embodiment, the stand time for the mixture obtained in step b) is in the range of 1 min to 24 h, more preferably from 1 min to 12 h, even more preferably from 1 min to 6 h, even more preferably from 1 min to 1 h, most preferably from 1 min to 30 min.

In a particular embodiment, step c) is not performed.

In a particular embodiment, all the steps of the process of the present invention are performed at a temperature in the range of 5 to 95° C., preferably from 10 to 30° C., more preferably from 20 to 25° C.

The microplastics obtained in step c) may be subjected to a further step of characterization for the purpose of knowing their composition, size, and/or shape. Likewise, the magnetic material obtained in step c) can be recovered and reused for the separation of microplastics from aqueous matrices, such as for example the processes described in documents ES 2 796 998 A1 and WO 2020/240069 A1.

Microplastics can be characterized by different techniques for the purpose of knowing their composition (Fourier transform infrared (FTIR) spectroscopy and/or Raman spectroscopy), size (light microscopy and/or scanning electron microscopy or dynamic light scattering (DLS)), and shape (light microscopy and/or scanning electron microscopy).

As shown in the examples, recovered microplastics were completely free of the magnetic material, achieving recovery yields for the magnetic material exceeding 99.0% regardless of the nature and size of the non-plastic organic solid particles. In a particular embodiment of the first aspect of the invention, at least 40% of microplastics were recovered; in another particular embodiment, at least 50% of microplastics were recovered; in a preferred embodiment, at least 70% of microplastics were recovered; in the most preferred embodiment, at least 90% of microplastics were recovered. Characterization of the recovered magnetic material allowed confirming that the solid did not sustain any significant change in its composition, size, and crystallinity. In fact, the recovered magnetic iron material was used again in the system without any loss of efficacy being observed.

Thus, in a second aspect, the invention relates to a process for breaking up magnetic iron material/organic particle aggregates according to the first aspect further comprising the characterization of the organic particles and/or the recovery of the magnetic iron material.

In additional aspect, the invention relates to the use of the process for breaking up magnetic iron material/organic particle aggregates according to the first aspect for the characterization of the organic particles and/or the recovery of the magnetic iron material.

Illustrative examples disclosing the features and advantages of the invention are described below; however, they must not be interpreted as being limiting of the object of the invention such as it is defined in the claims.

EXAMPLES

Materials and Methods

Determination of the Microplastic Particle Size and Shape

In the present invention, the microplastics were added to the aqueous matrices to subsequently carry out their magnetic separation by means of the process described in the specification. The particle size range of the microplastics was previously determined by means of sieving same using sieves of different sizes (5 mm, 1 mm, 500 µm, 250 µm, 100 µm, 50 µm, and 20 µm).

For microplastic size measurement, a Nikon Eclipse Ci-S/Ci-L upright light microscope equipped with a DS-Fi2 digital camera and a DS-U3 control unit, with software for measuring and processing images (NIS-Elements L imaging) was used. A JEOL JSM 6335F scanning electron microscope, with 10× to 500,000× amplification was also used. The length and width of the microplastics are measured, and they are assigned the size of the largest dimension (length). The shape of the microplastics is analyzed by observing images of the particles at different magnifications.

Determination of the Composition of the Microplastics

The composition of the microplastics was determined by means of Fourier transform infrared spectroscopy (FTIR). The samples of microplastics were analyzed following the conventional analysis method using KBr pellets. The pellets were prepared by adding 1 mg of a sample of microplastic and about 99 mg of KBr. The obtained powder mixture was compacted by applying 10 tons of pressure by means of a hydraulic press, obtaining the KBr pellets. The samples were then analyzed by means of the Spectrum Two spectrophotometer (Perkin Elmer). Transmission tests were performed in the spectral range of 4000-450 $cm^{-1}$. The obtained spectra were compared with library databases to determine the type of polymer that forms the microplastic using Perkin Elmer Spectrum Software.

Determination of the Magnetic Iron Material Particle Size

The magnetic iron material particle size (average diameter) and particle distribution were determined by means of the scanning electron microscopy analysis of the dry material. The equipment used was a JEOL JSM 6335F, with 10× to 500,000× amplification. The length and width of the magnetic iron material particles are measured, and they are assigned the size of the largest dimension (length). For the determination of the particle size distribution, it is appropriate to use the statistical values D10, D50, and D90, which intercept 10%, 50%, and 90% by volume of the accumulated particles.

Determination of the Percentage of Iron

The iron content of the magnetic iron material was determined using a total reflection x-ray fluorescence (TXRF) spectrometer, namely the S2 Picofox (Bruker) model, with a molybdenum source. The method of preparation of the sample consisted of the open vessel digestion thereof using a solution of hydrochloric acid, nitric acid, and hydrofluoric acid at a proportion by volume of 6:2:0.5, at 105° C. for 1.5 h. The concentration of material in the vessel was 1000 mg/L and a total volume of 10 mL was used. If necessary, the magnetic iron material was previously ground to a size less than 100 m. Once the material sample was digested, an internal gallium standard was added in the solution for later quantification. A 3-µL aliquot of the resulting solution was introduced in the spectrometer for analysis, which was performed at 50 kV and 600 µA with an acquisition time of 500 s. The integration of the peak corresponding to the iron in the obtained spectrogram allowed determining the percentage of iron by weight contained in the material.

X-Ray Diffraction

Powder x-ray diffraction (PXRD) was used to perform the identification and characterization of the crystalline phases present in the magnetic iron material. The samples were analyzed in an X'Pert PRO theta/theta diffractometer by Panalytical with a Cu tube (Kα radiation, 8.04 keV). The diffractometer has a secondary graphite monochromator and a Xe gas detector. A theta/2theta scan was performed with a 2θ range of 10 to 80°, an angular increment of 0.04°, and an accumulation time of 4 s. Prior to analysis, the magnetic iron material particles were ground, if necessary, to a size smaller than 100 µm. For the identification of the crystalline phases present in the obtained diffractograms, the High Score Plus software and the ICDD (International Centre for Diffraction Data) PDF-4 Full File crystallographic database were used.

Determination of Magnetic Saturation

The magnetic properties of the magnetic iron material were measured using a Quantum Design MPMS XL-5 magnetometer with a SQUID (superconducting quantum interference devices) sensor. If necessary, the magnetic iron material was previously ground to a size smaller than 100 µm. The magnetic moment (M) of the magnetic iron material was measured depending on the applied external magnetizing field (H) in the range of −10000 to 10000 Oe (equivalent to −797700 to 797700 A m$^{-1}$ in the SI) at room temperature. The magnetic saturation value is that value of M that is reached when any subsequent increase in H does not cause an increase in the magnetization of the material.

Example 1. Breaking Up Microplastic/Magnetic Iron Material Aggregates by Means of Treatment with a Concentrated Saline Solution Experiments for breaking up microplastic/magnetic iron material aggregates were performed after the formation of said aggregates obtained following the processes described in documents ES 2 796 998 A1 and WO 2020/240069 A1. Specifically, 20 mg of microplastic and 40 mg of magnetic iron mineral in a volume of 20 mL of water with a solid chloride concentration of 0.1 g/L and pH 7 were used. The microplastics, the magnetic iron mineral, and water were introduced in a glass vial. The suspension was mechanically stirred for 30 s using a paddle stirrer. Subsequently, a magnetic field generated with a magnet was applied to separate the aggregates and free magnetite. Three types of microplastic were used: polystyrene (PS), polypropylene (PP), and polyethylene terephthalate (PET). Likewise, two microplastic particle size ranges were tested: 100-250 µm and 250-500 µm. A magnetic iron mineral, i.e., ground magnetite (with a mean particle diameter of 0.2 µm under dry conditions and a particle size distribution as shown in FIG. 1) was used to perform the separation process. The crystalline character of the magnetite used was confirmed by means of x-ray diffraction analysis, which also showed that the only phase present in the solid is magnetite ($Fe_3O_4$). The percentage of magnetic iron mineral used was in the range of 68-78% by weight. In turn, the magnetic saturation value of the material was in the range of 70 to 90 emu/g, which corresponds with 70·10$^3$ to 90·10$^3$ A/m in SI units.

The separation of polystyrene, polypropylene, and polyethylene terephthalate microplastics exceeded 99.0%. Likewise, more than 99.9% of the added magnetite was also removed from the water. The magnetically separated solids, particularly the microplastic/magnetic material aggregates (clearly distinguishable by their larger size (100-250 µm and 250-500 µm)), were then subjected to the process of breaking up the aggregates.

The microplastic/magnetic material aggregates were resuspended in 20 mL of a concentrated saline solution ($NaH_2PO_4$, 850 g/L, density 1.35 g/cm$^3$). The sample was mechanically stirred in a vigorous manner for 15 minutes and then introduced in an ultrasound bath for another 20 minutes. After the experiment, floating particles located in the upper part of the vial were collected with a pipette and the rest of the contents of the vial was subjected to filtration. All the solids that had settled at the bottom of the vial were thereby removed. Both the floating particles (fundamentally, microplastics) and those solids that had settled (fundamentally, magnetic material) were washed using deionized water for the purpose of removing salt residues from the surface of the particles. All the tests were performed in triplicate and at room temperature (20-25° C.).

Figure 2:
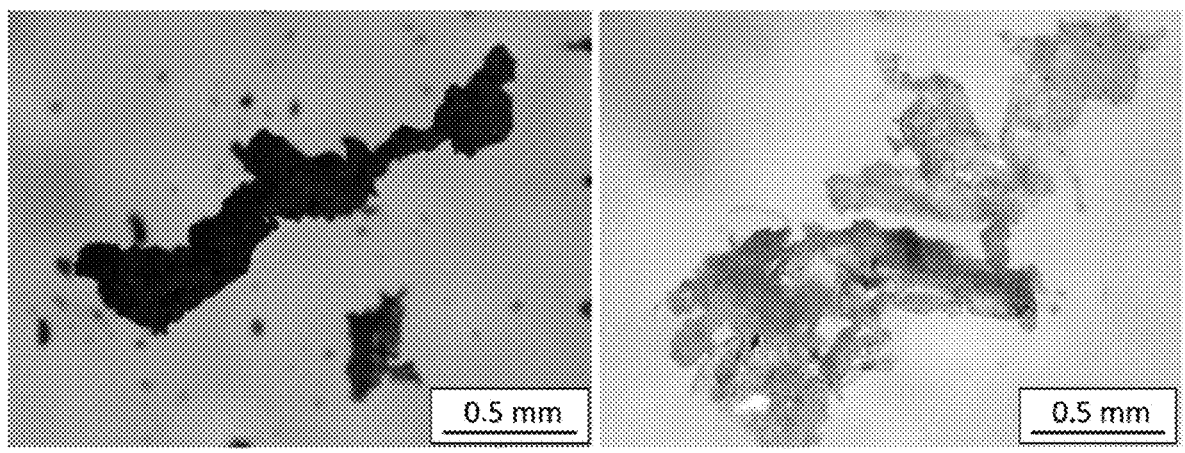
FIG. 2: Light microscopy images of the PS (250-500 µm)/magnetic material aggregates before (left) and after (right) treatment with the concentrated $NaH_2PO_4$ solution.
Figure 3:
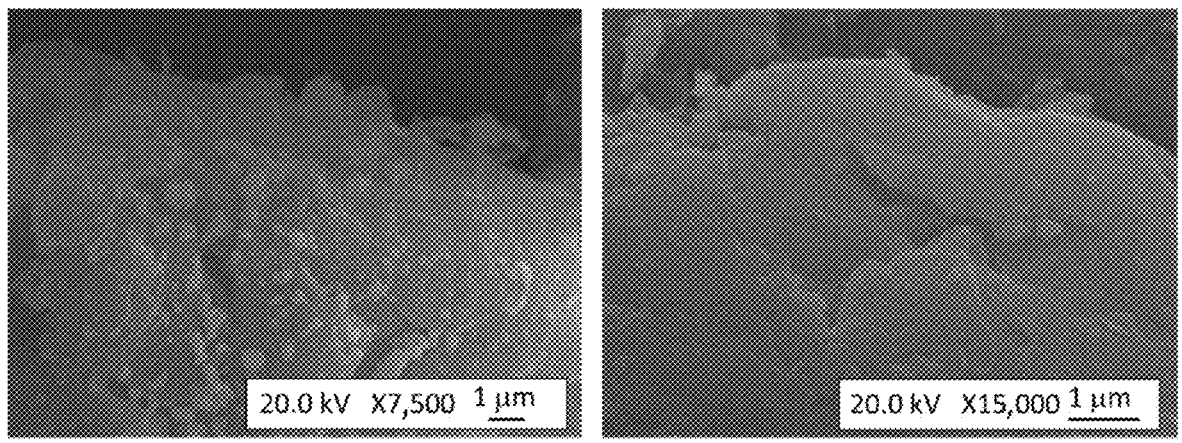
FIG. 3: Scanning electron microscopy images of the PS (250-500 µm)/magnetic material aggregates before (left) and after (right) treatment with the concentrated $NaH_2PO_4$ solution.
Figure 4:
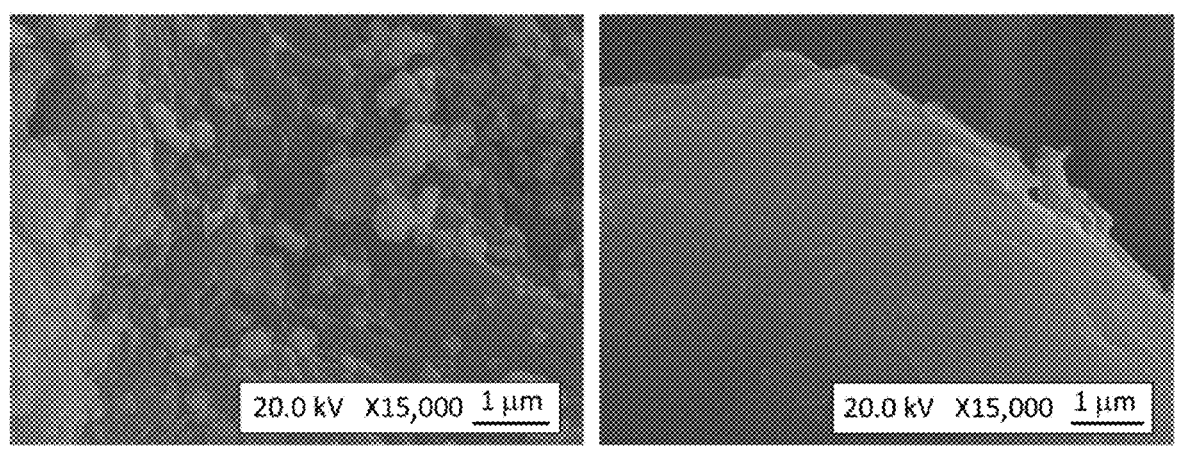
FIG. 4: Scanning electron microscopy images of the PET (100-250 µm)/magnetic material aggregates before (left) and after (right) treatment with the concentrated $NaH_2PO_4$ solution.

Table 1 shows the results obtained in breaking up microplastic/magnetic material aggregates with different sizes and plastic types, considering the percentage of clean (magnetic material-free) microplastic recovery. FIGS. 2 and 3 show the light microscopy images and scanning electron microscopy images, respectively, of the microplastic/magnetic material aggregates before and after being subjected to treatment with the concentrated saline solution with 250-500 µm PS microplastic. Likewise, FIG. 4 shows the scanning electron microscopy images, respectively, of the microplastic/magnetic material aggregates before and after being subjected to treatment with the concentrated saline solution with 100-250 µm PET microplastic.

The microplastic/magnetic material aggregates were broken up in a very efficient manner, achieving recovery yields exceeding 99.0% regardless of the nature and size of the plastic. As shown in FIGS. 2, 3, and 4 illustrating light microscopy and scanning electron microscopy images, respectively, the recovered microplastics were completely clean. In that sense, their surfaces in no case showed the presence of magnetic material, and this is a good example of the effectiveness of the treatment developed for breaking up microplastic/magnetic material aggregates.

It is important to highlight that during treatment for breaking up the aggregates, the leaching of iron from the magnetic material was completely negligible (<0.1 mg/L).

TABLE 1

| Microplastics | | Magnetite | | Breaking up of aggregates |
|---|---|---|---|---|
| Nature | Size (μm) | Amount (mg) | Size (μm) | Amount (mg) | Percentage of recovered clean microplastics (%) |
| PS | 100-250 | 20 | 0.2 | 40 | ≥99.0 |
|  | 250-500 |  |  |  | ≥99.0 |
| PP | 100-250 |  |  |  | ≥99.0 |
|  | 250-500 |  |  |  | ≥99.0 |
| PET | 100-250 |  |  |  | ≥99.0 |
|  | 250-500 |  |  |  | ≥99.0 |

The breaking up experiments of microplastic-magnetic iron material aggregates using the process of the invention were also carried out using PS of size 250-500 μm as a microplastic by following the procedure detailed in Example 1, but varying the concentration of saline solution, e.g. the concentration of aqueous $NaH_2PO_4$ (0.5, 10, 100, 500 and 850 g $L^{-1}$).

Table 2 shows the percentage of recovery of clean microplastic (free of magnetic material) obtained from the breaking up of the microplastic-magnetic material aggregates (PS of size 250-500 μm and $Fe_3O_4$) at different salt concentrations. As it can be seen, the percentage of clean microplastics recovered is moderate at a $NaH_2PO_4$ concentration of 10 g $L^{-1}$ but increased significantly up to 91.0% at a salt concentration of 500 g $L^{-1}$. Virtually quantitative recovery was obtained at a salt concentration of 850 g $L^{-1}$. These results show that the recovery can be performed across a wide range of salt concentration.

TABLE 2

| PS (mg) | $Fe_3O_4$ (mg) | $NaH_2PO_4$ concentration (g $L^{-1}$) | Recovered clean microplastics (%) |
|---|---|---|---|
| 20 | 40 | 0.5 | 41.6 |
|  |  | 10 | 51.7 |
|  |  | 100 | 74.5 |
|  |  | 500 | 91.0 |
|  |  | 850 | 99.0 |

Next, the effect of the salt of the saline solution was evaluated. The microplastic/magnetic material aggregates were resuspended in 20 mL of a NaCl or NaI solution (NaCl: 360 g/L, density 2.16 g/cm³; NaI: 460 g/L, density 3.67 g/cm³). The sample was vigorously mechanically shaken for 15 minutes and then placed in an ultrasonic bath for another 20 minutes. After the experiment, the floating particles located in the upper part of the vial were collected with a pipette and the rest of the vial contents were filtered. All the solids sedimented at the bottom of the vial were removed. Both the floating particles (mainly microplastics) and those that sedimented (mainly ferromagnetic material) were simply washed using deionized water in order to remove traces of salt from the surface of the particles. All assays were performed in triplicate.

Table 3 shows the results obtained in the rupture of the microplastic/magnetic material aggregates with a saline solution of NaCl and NaI.

TABLE 3

| | PS | | Magnetite | | |
|---|---|---|---|---|---|
| Salt | Size (μm) | Amount (mg) | Size (μm) | Amount (mg) | Recovered clean microplastics (%) |
| NaCl | 250-500 | 20 | 0.2 | 40 | ≥92.0 |
| NaI | 250-500 | 20 | 0.2 | 40 | ≥99.0 |

Example 2. Breaking Up Non-Plastic Organic Solid Particle/Magnetic Iron Material Aggregates by Means of Treatment with a Concentrated Saline Solution Experiments for breaking up non-plastic organic solid particle/magnetic iron material aggregates were performed after the experiment for the magnetic separation of said particles following the same process described in Example 1. 20 mg of non-plastic organic solid particles and 40 mg of magnetic iron mineral in a volume of 20 mL were used. Three types of non-plastic organic solid particles in water were used: pine needles, elm leaves, and mimosa leaves. In all cases, ground leaves sifted in a size range of 100 to 250 μm using sieves with said mesh opening diameters were used. A magnetic iron mineral, i.e., ground magnetite (with a mean particle diameter of 0.2 μm under dry conditions and a particle size distribution as shown in FIG. 1) was used to perform the separation process. The crystalline character of the magnetite used was confirmed by means of x-ray diffraction analysis, which also showed that the only phase present in the solid is magnetite ($Fe_3O_4$). The percentage of magnetic iron mineral used was in the range of 68-78% by weight. In turn, the magnetic saturation value of the material was in the range of 70 to 90 emu/g, which corresponds with $70 \cdot 10^3$ to $90 \cdot 10^3$ A/m in SI units.

Separation of the non-plastic organic solid particles from water exceeded 99.0%. Likewise, more than 99.9% of the added magnetite was also removed from the water. The magnetically separated solids, particularly the non-plastic organic solid particle/magnetic material aggregates (clearly distinguishable by their larger size (100-250 μm), were then subjected to the process of breaking up the aggregates.

The non-plastic organic solid particle/magnetic material aggregates were resuspended in 20 mL of a concentrated saline solution ($NaH_2PO_4$, 850 g/L, density 1.35 g/cm³). The sample was mechanically stirred in a vigorous manner for 15 minutes and then introduced in an ultrasound bath for another 20 minutes. After the experiment, floating particles located in the upper part of the vial were collected with a pipette and the rest of the contents of the vial was subjected to filtration. All the solids that had settled at the bottom of the vial were thereby removed. Both the floating particles (fundamentally, organic particles) and those particles that had settled (fundamentally, magnetic material) were washed using deionized water for the purpose of removing salt residues from the surface of the particles. All the tests were performed in triplicate and at room temperature (20-25° C.).

Table 4 describes the results obtained in breaking up the non-plastic organic solid particle/magnetic iron material aggregates, considering the percentage of clean (magnetic iron material-free) non-plastic organic solid particle recovery.

The non-plastic organic solid particle/magnetic iron material aggregates were broken up in a very efficient manner, achieving recovery yields exceeding 99.0% regardless of the nature and size of the non-plastic organic solid particles.

It is important to highlight that during treatment for breaking up the aggregates, the leaching of iron from the magnetic material was completely negligible (<0.1 mg/L).

TABLE 4

| Particles in suspension | | Magnetite | | Breaking up of aggregates Percentage of |
|---|---|---|---|---|
| Nature | Size (μm) | Amount (mg) | Size (μm) | Amount (mg) | recovered clean organic particles (%) |
| Pine needle | 100-250 | 20 | 0.2 | 40 | ≥99.0 |
| Elm leaf | 100-250 | | | | ≥99.0 |
| Mimosa leaf | 100-250 | | | | ≥99.0 |

| Particles in suspension | | Magnetite | | Breaking up of aggregates Percentage of recovered clean organic particles (%) |
|---|---|---|---|---|
| Nature | Size (μm) / Amount (mg) | Size (μm) | Amount (mg) | |
| Pine needle | 100-250 / 20 | 0.2 | 40 | ≥99.0 |
| Elm leaf | 100-250 | | | ≥99.0 |
| Mimosa leaf | 100-250 | | | ≥99.0 |

Example 3. Reusing the Magnetic Iron Material Recovered by Means of Treating the Magnetic Fraction Obtained in the Separation of Polystyrene Microplastics Contained in a Synthetic Aqueous Matrix with a Concentrated Saline Solution Experiments for reusing the magnetic iron material were performed after the experiment for the magnetic separation of polystyrene microplastics with a size range of 100-250 μm contained in a synthetic aqueous matrix. To give rise to the formation of microplastic/magnetic iron material aggregates, the process described in Example 1 using 20 mg of microplastic and 40 mg of magnetic iron mineral in a volume of 20 mL was followed. A magnetic iron mineral, i.e., ground magnetite (with a mean particle diameter of 0.2 μm under dry conditions and a particle size distribution as shown in FIG. 1) was used to perform the separation process. The crystalline character of the magnetite used was confirmed by means of x-ray diffraction analysis, which also showed that the only phase present in the solid is magnetite ($Fe_3O_4$). The percentage of magnetic iron mineral used was in the range of 68-78% by weight. In turn, the magnetic saturation value of the material was in the range of 70 to 90 emu/g, which corresponds with $70 \cdot 10^3$ to $90 \cdot 10^3$ A/m in SI units.

Separation of polystyrene microplastics from the synthetic aqueous matrix was performed by the formation of microplastic/magnetic iron material aggregates and the application of a magnetic field. The microplastic separation yield exceeded 99.0%. Likewise, more than 99.9% of the added magnetite was also removed from the water. All the magnetically separated solid particles were then subjected to the process of breaking up the aggregates, according to the process described in Example 1.

Magnetite recovered after treatment with the concentrated saline solution ($NaH_2PO_4$, 850 g/L, density 1.35 g/cm$^3$) was washed with abundant deionized water and taken to dryness (60° C. for 12 h). Next, said magnetite was again used for the separation of polystyrene microplastics with a size range of 100-250 μm from a synthetic aqueous matrix. 20 mg of microplastic and 40 mg of reused magnetic iron mineral in a volume of 20 mL were used following the process described in Example 1. The results obtained are described in Table 5.

TABLE 5

| PS microplastic | | Reused magnetite | | |
|---|---|---|---|---|
| Size (μm) | Amount (mg) | Size (μm) | Amount (mg) | PS microplastic separation yield (%) |
| 100-250 | 20 | 0.2 | 40 | >99.0% |

The reused magnetic iron material allowed achieving the same polystyrene microplastic separation yield as fresh magnetic iron material, and this confirms the viability of the recovery treatment developed. It is important to also highlight that during treatment, the leaching of iron from the magnetic material was completely negligible (<0.1 mg/L). Likewise, characterization of the recovered magnetic iron material allowed confirming that the mineral did not sustain any significant change in its composition, size, and crystallinity.

The invention claimed is:

1. A process for breaking up magnetic iron material/organic particle aggregates, the process comprising:
    a) providing the magnetic iron material/organic particle aggregates,
    b) introducing the aggregates of step a) in an aqueous saline solution for breaking up the aggregates, wherein the salt of the aqueous saline solution is selected from the group consisting of NaH2PO4, Na2HPO4, Na3PO4, NaCl, NaI, and mixtures thereof, and wherein the salt concentration of the aqueous saline solution is in the range of 100 g/L to 1000 g/L, and
    c) separating the magnetic iron material particles from the organic particles by density and/or by applying a magnetic field;
    wherein the organic particles are selected from the group consisting of microplastics, non-plastic organic particles, and a mixture thereof,
    wherein said organic particles have a size in the range of 0.1 μm to 5 mm, and
    wherein at least 70% of the organic particles are recovered in step c).

2. The process according to claim 1, wherein the organic particles are microplastics.

3. The process according to claim 1, wherein the microplastics are selected from the group consisting of polystyrene (PS), polypropylene (PP), polyethylene terephthalate (PET), polyethylene (PE) including high-density polyethylene (HDPE) and low-density polyethylene (LDPE), polyvinyl chloride (PVC), polycarbonate (PC), polyurethane (PU), and mixtures thereof.

4. The process according to claim 1, wherein the organic particles have a size in the range of 0.1 μm to 1 mm.

5. The process according to claim 1, wherein the salt of the aqueous saline solution of step b) is selected from the group consisting of NaH2PO4, NaCl, NaI, and mixtures thereof.

6. The process according to claim 1, wherein the magnetic iron material comprises an iron species selected from the group consisting of Fe(II), Fe(III), metallic Fe, and a mixture thereof.

7. The process according to claim 6, wherein the magnetic iron material is magnetite.

8. The process according to claim 1, wherein the average diameter of the magnetic iron material is comprised between 0.1 μm and 10 μm.

9. The process according to claim 8, wherein the average diameter of the magnetic iron material is comprised between 0.1 μm and 0.3 μm.

10. The process according to claim 1, wherein the concentration of aggregates introduced in the aqueous saline solution in step b) is 1 mg/L to 2000 g/L.

11. The process according to claim 1, wherein the mixture resulting from step b) is subjected to stirring.

12. The process according to claim 1, wherein the magnetic iron material particles are separated from the organic particles in step c) by density.

13. Process according to claim 1 further comprising i) the characterization of the organic particles, and/or ii) the recovery of the magnetic iron material.

14. The process according to claim 1, wherein the microplastics are selected from the group consisting of polystyrene, polypropylene, polyethylene terephthalate, and mixtures thereof.

15. The process according to claim 1, wherein the organic particles have a size in the range of 100 μm to 500 μm.

16. The process according to claim 1, wherein the organic particles have a size in the range of 100 μm to 250 μm.

\* \* \* \* \*